INVENTOR
LOUIS W. PARKER
BY Moore & Hall
ATTORNEYS 3,080,541
Patented Mar. 5, 1963

3,080,541

PRINTED CIRCUITS

Louis W. Parker, 28 Polo Road, Great Neck, N.Y.

Filed July 9, 1956, Ser. No. 596,513
7 Claims. (Cl. 336—200)

The present invention relates to printed circuits and techniques for producing such circuits; and is more particularly concerned with the construction of improved coil structures exhibiting novel electrical characteristics. In this respect, the present invention comprises a continuation-in-part of my prior copending application Serial No. 287,704, filed May 14, 1952, for "Electrical Indicating Instrument," now U.S. Patent No. 2,773,239.

Various techniques have been suggested in the past for producing printed circuits, and for the most part these known techniques comprise the formation of a conductive coating or line upon a non-conductive base structure such as a ceramic or Bakelite wafer, by printing, etching, spraying, silk-screening, etc. When the resulting "printed circuit" takes the form of a coil supported upon a relatively massive insulator base, the coil presents appreciable inductance even when the other side of said insulator is adjacent to a metal surface. Under some circumstances, and particularly in electrical indicating instruments of the types described in my above identified prior copending application, it is highly desirable to provide coil structures wherein the inductance of the coil itself is substantially eliminated.

The present invention directly provides such coil structures by the utilization of printed circuit techniques wherein a printed circuit of coil configuration is supported by a metallic, rather than non-metallic, base structure, the base structure and circuit thereon being electrically separated from one another by an extremely thin coating or layer of insulating material. Such metal base printed circuit coils are characterized by an extremely close coupling between the printed coil and the metallic conductive material comprising the said base structure; and in fact this coupling approaches one hundred percent. By reason of this extremely close coupling, therefore, it is possible to have no appreciable magnetic field when alternating current is applied to the coil, and this characteristic in turn does not affect the field which is produced by the coil upon application of direct current thereto.

Moreover, by using a metallic base structure for supporting a printed circuit, several further appreciable advantages arise. In particular, the base structure itself, being of metal, exhibits excellent physical strength accompanied by low weight, whereby, particularly in meter applications, the air gaps, weight and physical dimensions of an overall structure may be appreciably reduced. Moreover, the base structure, being of metal, may be considered to act as a short-circuited metallic conductor closely adjacent to but insulated from the printed circuit supported thereby; and when the composite structure so provided is utilized as the moving element of a meter device, eddy currents induced in the short-circuited conductor or metallic base provide excellent damping of the meter movement.

It should further be noted that while the subsequent description is concerned with the printing of coil structures on metallic bases, such metallic base printed circuit structures find considerable utility in applications other than those concerned with metering, and in applications other than those employing coils. Thus, various electronic circuits employing printed techniques ordinarily dispense with conventional metal chassis, although it has been determined that the operation of certain such circuits, e.g. high gain amplifiers, is considerably enhanced by such a chassis acting as a ground plane or shield.

Various efforts have accordingly been made to simulate metal chassis structures in printed circuits, and these efforts have included the provision of large areas of conductive material disposed on the reverse side of a printed circuit non-metallic insulating board, with the said areas of conductive material being connected to signal ground. In addition, the printed circuits suggested heretofore, in seeking to provide the desirable shielding and ground plane effects of conventional chassis, have included areas of grounded conductive material disposed between printed wiring areas and the like.

These devious and often complex techniques are obviated by employing the method and structures of the present invention, wherein printed circuits are supported upon a metallic base structure, inasmuch as the said base structure acts directly to provide the ground plane and shielding effects desired in improving performance of various critical circuits. Moreover, the overall structure thus provided is free from inflammability, finds utility at elevated temperatures, and is adapted to receive printed circuits on both sides of the base structure, in which event the metallic base may act as a common grounded "chassis" disposed between such opposing circuits thereby to effect shielding and isolation between the said circuits.

Moreover, condensers and particularly by-pass condensers of substantial capacity can be formed on such metal chassis by printing a flat surface thereof as part of the printed wiring. The said chassis or metal base may, in accordance with the present invention, be fabricated of aluminum having a thin insulating coating of aluminum oxide thereon and, due to the extreme thinness and good insulating qualities of such aluminum oxide coatings, such a condenser is in fact superior to other types previously effected by printing on insulators such as Bakelite or ceramic.

It is accordingly an object of the present invention to provide improved printed circuits as well as improved techniques for fabricating such circuits.

Another object of the present invention resides in the provision of an improved printed circuit coil structure having substantially no self-inductance.

Still another object of the present invention resides in the provision of improved printed circuit structures as well as techniques for fabricating the same, which structures and techniques utilize metallic or other conductive supporting structures rather than the non-conductive support structures employed heretofore.

Another object of the present invention resides in the provision of improved printed circuits utilizing anodized aluminum support structures.

Still another object of the present invention resides in the provision of printed circuit structures which are more rugged in configuration, less complex in construction, and which have better electrical characteristics than those suggested in the past.

A further object of the present invention resides in the provision of improved printed circuits as well as techniques for fabricating the same whereby conductive base structures having various configurations, including planar, curved, and cylindrical configurations, may serve to support conductive deposits thereon.

Another object of the present invention resides in the provision of improved printed circuits which obviate the necessity of special ground plane structures necessary, in various applications, heretofore.

A further object of the present invention resides in the provision of printed circuit structures which may be fabricated more readily and conveniently, and at less expense, than circuits suggested heretofore.

A further object of the present invention resides in the provision of an inexpensive way of making a condenser of substantial capacity, one side of said condenser being grounded and the other side of said condenser comprising part of a printed circuit, the said condenser including a very thin insulation coating on the grounded portion thereof as a dielectric.

The foregoing objects, advantages, construction and operation of the present invention will become more readily apparent from the following description and accompanying drawings, in which.

Figure 1:
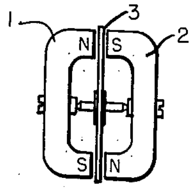
FIGURE 1 is a plan view illustrating a simple metering structure which may be constructed in accordance with the present invention.

As has been discussed previously, the present invention contemplates the provision of improved printed circuits as well as techniques for effecting such printed circuits, wherein the circuit itself comprises a conductive configuration supported by a base structure of metal or conductive material with the two being separated from one another by an extremely thin coating of insulating material.

In accordance with a preferred embodiment of the present invention, the aforementioned conductive base structure comprises aluminum or an aluminum alloy, and the said conductive printed circuit is separated from the said aluminum or alloy base structure by an extremely thin coating or layer of insulating material comprising a compound that includes part of the metal of said aluminum or alloy base structure, e.g. aluminum oxide. In practice, the said thin insulating layer has a thickness in the order of .0005 inch. The printed circuit itself may take various configurations; and in accordance with a preferred embodiment of the present invention, may take the form of one or more coils disposed upon one or both sides of the said insulation coated aluminum base structure, whereby the extremely close coupling between the coil and base structure effects a printed coil having substantially no self-inductance. As will become apparent from the following description, various techniques may be utilized in the fabricating of the improved printed circuits comprising the present invention; and a particular preferred technique in this respect comprises a photoengraving process.

Referring now to the drawing, it will be seen that, in accordance with the present invention, a meter structure (FIGURE 1) may comprise, for instance, a rotatable disk 3 disposed between two permanent magnets 1 and 2, such a structure having been described in my prior copending application Serial No. 287,704. Disk 3 preferably comprises aluminum or an aluminum alloy, and each side of the said disk 3 includes two coils formed thereon by a printing technique; each of the said printed coils is separated from the main body of disk 3 by a thin layer of insulating material such as, for example, aluminum oxide.

Figures 3A, 3B:
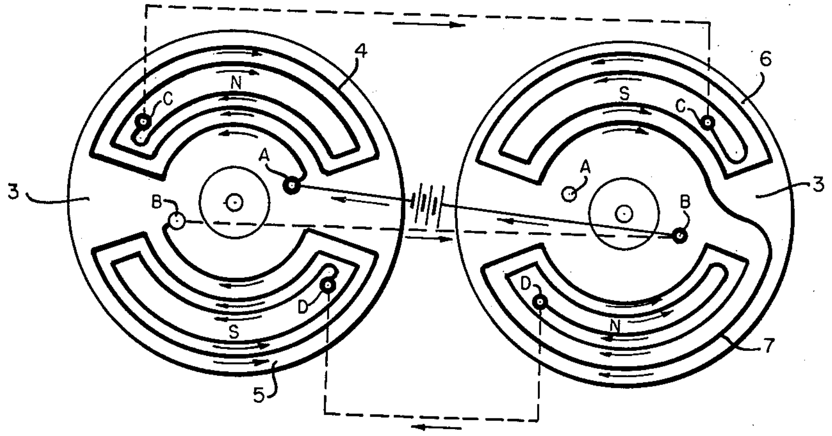
FIGURES 3A and 3B illustrate respectively the opposing faces of a novel printed circuit constructed in accordance with the present invention and adapted to be employed in the metering devices of FIGURES 1 and 2.

Referring to FIGURES 3A and 3B which illustrate the opposing sides of a disk such as 3, it will be seen that the coils may in fact be four in number, and these have been designated respectively as coils 4 through 7 inclusive. Coils 4 through 7 comprise, as has been discussed, a conductive material disposed upon the opposing sides of aluminum or aluminum alloy disk 3 and separated from the said disk 3 by the aforementioned insulating material. The four coils 4 through 7 are connected in series in such a manner as to form two magnetic poles when fed by an appropriate D.C. current source, and these poles have been indicated by "N" and by "S," for north and south poles respectively. On the side of the disk shown in FIGURE 3A, the input ends of both upper and lower coils 4 and 5 are connected to studs A and B, and these studs project from opposite sides of the disk 3. The middle end of each of coils 4 and 5 terminates at holes C and D on one face of disk 3, and the ends of coils 4 and 5, connected to the said holes C and D, are also connected to an inner end of coils 6 and 7 respectively, on the other face of aluminum disk 3. In this respect it should be noted that the edges of metal disk 3, on the inside of holes C and D, are also covered with a sleeve of insulation, for example the aforementioned aluminum oxide, whereby the connections between coils 4 through 7 on opposing sides of the disk 3 may be effected through the agency of a conductive deposit passing from one to the other side of disk 3 via the holes C and D.

As has been described in my prior copending application, the two studs A and B serve to provide electrical connections for the four coils 4 through 7; and in particular, direct current may be coupled to the said studs A and B through the provision of helical hair springs. When direct current does in fact pass through the coils 4 through 7, the said coils generate magnetic poles on disk 3, thereby exterting a mechanical force which tends to rotate the disk so as to align coils 4 through 7 in a proper manner with respect to the magnetic fields of permanent magnets 1 and 2 (FIGURE 1).

Figure 2:
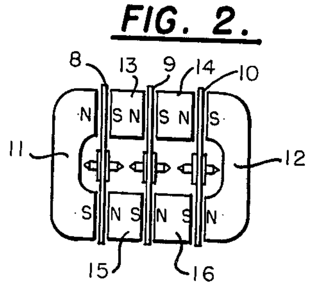
FIGURE 2 is a plan view of a further metering structure constructed in accordance with the presence invention wherein a plurality of metering devices may be disposed closely adjacent one another.

As has also been described in my prior copending application, moving structures generally of the type described in FIGURES 3A and 3B, may be employed in improved meter constructions wherein a plurality of meter movements are disposed closely adjacent one another in a limited volume. In particular, referring to FIGURE 2, it will be seen that a plurality of aluminum or other metallic disks having the aforementioned printed coils thereon, such as disks 8, 9 and 10, may be disposed in spaced relation to one another in combination with U-shaped end magnets 11 and 12 and interposed bar magnets 13 through 16, with the poles of the several magnets 11 through 16 connected in series with one another, as illustrated in FIGURE 2; and each section of the composite meter so provided acts independently of other sections thereof, generally in the manner already described with reference to the meter structure of FIGURE 1.

The present invention relates particularly to the printed circuit or coil structure described, and to techniques for fabricating the same, wherein an extremely thin coating of insulating material serves to separate a metallic or other conductive printed circuit from a metal or other conductive base structure. When the base structure is aluminum or an aluminum alloy and the insulating material comprises aluminum oxide, the following technique may be employed in fabricating the printed circuit or improved non-self-inductive coils of the present invention:

The aluminum or aluminum alloy base is first anodized by known techniques thereby to effect an extremely thin coating of aluminum oxide, in the order of .0005 inch or less, on one or both sides of the said aluminum or aluminum alloy base structure. The anodized surface of the said aluminum base structure is then coated with a continuous layer of conductive material held fast, if desired, by an appropriate adhesive and a light-sensitive material may thereafter be deposited over the said conductive layer. A positive or negative image (depending on the process) of the coil or other desired printed circuit, is thereafter photographically reproduced onto the light-sensitive surface and, in accordance with known photographic techniques, the non-illuminated areas may thereafter be washed off the above exposed surface, and the resultant picture "fixed" onto the said surface.

It will be appreciated that the remaining fixed layer is resistant to an etching acid and that, moreover, this fixed layer, due to the aforementioned photographic step, assumes the configuration of the final printed circuit which is desired. Accordingly, an etching liquid, e.g. an acid, may now be applied to the surface or surfaces of the overall structure whereby unprotected areas of the aforementioned conductive material are etched away leaving the remaining conductive material in the configuration of the desired coil or other circuit. The overall structure thus effected comprises a base member of aluminum or aluminum alloy having a conductive circuit deposited thereon and separated from the said conductive base by a thin substantially continuous layer of aluminum oxide. Between the aluminum oxide and the conductive material, moreover, there may be a layer of adhesive which adds to the insulating properties of the said aluminum oxide layer.

It will be appreciated that while aluminum and aluminum oxide comprise preferred base and insulating structures, respectively, in accordance with the present invention, the several advantages described previously with respect to the utilization of conductive base materials supporting, in insulated relation thereto, conductive printed circuits, arise when other metals are employed. Accordingly, the use of such other metals in providing the novel printed circuits of the present invention are contemplated herein. Moreover, while a photoengraving technique provides a ready and convenient method for the fabrication of the novel printed circuits of the present invention, other coating techniques well known in the art may, if desired, be employed in the fabrication of my improved printed circuit. For instance, rather than producing the desired coil or circuit configuration by a photographic technique, the circuit lines may be directly printed on the surfaces of my improved structures by rolling a device such as a rubber stamp over the said surface or surfaces. Other modifications and techniques will be readily apparent to those skilled in the art.

In addition, it should be noted that while the foregoing description has referred to the fabrication of coils, the same technique may be employed in producing improved condensers. In such an event, the aluminum base and printed circuit act respectively as opposing plates of the condenser, and the aluminum oxide layer therebetween acts as a dielectric for the said condenser. Moreover, when an insulating adhesive is employed to secure the aforementioned conductive coating or layer to the anodized layer, this adhesive also acts as a portion of the dielectric.

It should further be noted that the particular structure described in reference to FIGURES 3A and 3B is substantially planar in configuration; but in some cases it may be desired to provide the improved printed circuits of the present invention (i.e. coils, condensers, etc.) on metal base structures which are other than flat. When a photoengraving technique, such as has been described previously, is to be employed for fabricating a printed circuit on such a non-flat base structure, a form made of glass or other transparent material and designed to accurately fit the curvature of the base structure, may be utilized to facilitate production of the printed circuit. When such a glass or other transparent form is employed, non-transparent lines or areas may be formed on a surface of the said transparent form by painting or other suitable processes; and the said transparent form may then be fitted directly over the non-planar aluminum or metal base whereafter light passed through the said transparent form from all necessary angles can effect the photographic exposure on the previously prepared non-planar metal base structure. Such a technique finds considerable utility in the fabrication of structures such as have been illustrated in FIGURES 4 and 5.

Figure 4:
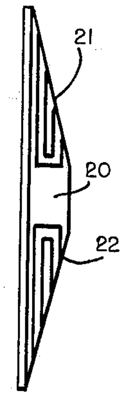
FIGURE 4 is an end view of a further printed circuit structure constructed in accordance with the present invention and taking the form of a shallow cone.
Figure 5:
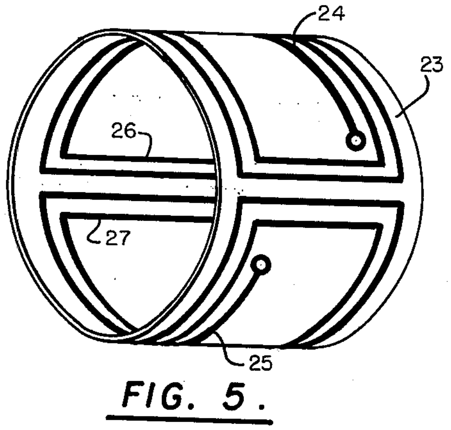
FIGURE 5 is a perspective view of still another form of the present invention wherein printed circuits are disposed upon a cylindrical support structure.

In particular, referring to FIGURE 4, it will be seen that the aluminum, aluminum alloy or other metal base structure 20 may assume a dished or shallow conical configuration, and such a structure again finds utility in meters generally of the type previously described in reference to FIGURES 1 and 2. Such a metallic dished structure 20 may, as before, carry printed coils 21 and 22 thereon, and further coils may, if desired, be disposed on the dished inner surface (not shown) of the said base structure 20. The techniques and structures of the present invention may further be employed in providing a cylindrical device of the type installed in FIGURE 5; and again the base structure 23, which is this time of cylindrical shape, may comprise aluminum, an aluminum alloy or other metallic material, having printed coils 24 and 25 on the outer surface thereof, and further printed coils 26 and 27, for instance, on the inner surface thereof. When utilized as a control or metering structure, the cylindrical coil of FIGURE 5 may be associated with a magnetic structure having a shape or configuration similar to those employed in conventional electric current measuring meters.

It will be appreciated that the structural embodiments of FIGURES 4 and 5 again contemplate the provision of an extremely thin layer of insulating material, such as aluminum oxide, disposed between the several coils or printed circuits and the metal base structure; and the overall configurations may, as before, be constructed by a photoengraving technique, particularly when a transparent or glass form of the type described is employed.

While I have thus described preferred structures and techniques, in accordance with the present invention, various modifications will be suggested to those skilled in the art. The foregoing description is therefore meant to be illustrative only and should not be considered limitative of my invention; and all such modifications as are in accord with the essence of my invention, namely, the provision of a conductive printed circuit supported in insulated relation upon a metallic or other conductive base member, are meant to fall within the scope of the appended claims.

Having thus described my invention, I claim:

1. A printed coil structure having a D.C. magnetic field with substantially zero inductance for alternating current, said coil structure including a highly conductive metallic supporting member comprising a metal of high electrical conductivity, said supporting member having a pair of spaced faces, a thin layer of insulating material on at least one of said faces, and a conductive deposit of coil configuration having all portions thereof carried by said supporting member adjacent said one of said faces, said conductive coil deposit having a thickness less than that of said supporting member, all portions of said conductive coil deposit including a common surface disposed closely adjacent to but electrically insulated from said highly conductive supporting member by said layer of insulating material whereby said coil deposit is closely coupled electrically to said conductive supporting member.

2. A printed coil circuit having substantially zero self-inductance comprising an aluminum support member having a pair of spaced support surfaces, each of said support surfaces being altered thereby to provide an extremely thin insulating layer thereon consisting of a compound that includes part of the aluminum of said support member, a relatively thin conductive deposit of coil configuration on each of said altered support surfaces, all portions of each said coil deposit being carried by said support surfaces with all the innermost portions of each said deposit being spaced from its adjacent support surface by a distance corresponding substantially to the thickness of said insulating layer, whereby said deposits are both closely coupled electrically to said support member, and conductive means extending through said support member and electrically insulated therefrom for electrically interconnecting said conductive deposits.

3. The coil of claim 1 wherein said insulating material includes an insulating adhesive for holding said conductive coil deposit adjacent said metallic supporting member.

4. The structure of claim 1 wherein said supporting member includes an edge portion extending between said pair of spaced faces, conductive deposits of coil configuration being carried by both of said pair of spaced faces, a layer of insulating material covering said edge portion, and a further conductive deposit on said last named layer extending between the spaced faces of said metallic supporting structure and connected to each of said conductive coil deposits thereby to electrically interconnect said coil configuration deposits.

5. The combination of claim 1 wherein said metallic supporting member is substantially planar in configuration.

6. The combination of claim 1 wherein said metallic supporting member comprises a hollow conical configuration.

7. The combination of claim 1 wherein said metallic supporting member comprises a hollow cylindrical configuration.

References Cited in the file of this patent

UNITED STATES PATENTS

| | | |
|---|---|---|
| 2,014,524 | Franz | Sept. 17, 1935 |
| 2,088,949 | Fekete | Aug. 3, 1937 |
| 2,408,910 | Burnham | Oct. 8, 1946 |
| 2,474,988 | Sargrove | July 5, 1949 |
| 2,703,854 | Eisler | Mar. 8, 1955 |
| 2,716,268 | Steigerwalt | Aug. 30, 1955 |
| 2,753,619 | Franklin | July 10, 1956 |
| 2,910,662 | Rex | Oct. 27, 1959 |
| 2,937,351 | Craig | May 17, 1960 |

FOREIGN PATENTS

| | | |
|---|---|---|
| 649,398 | Great Britain | Jan. 24, 1951 |

OTHER REFERENCES

"Printed Circuit Techniques," National Bureau of Standards Circular 468, November 15, 1947, particularly pp. 17 and 18.